United States Patent

Wiorek et al.

[11] Patent Number: 6,108,550
[45] Date of Patent: Aug. 22, 2000

[54] REUSE OF A PHYSICAL CONTROL CHANNEL IN A DISTRIBUTED CELLULAR RADIO COMMUNICATION SYSTEM

[75] Inventors: Jonas Wiorek; Magnus Frodigh, both of Sollentuna; Per Beming, Stockholm, all of Sweden; Kenneth Wallstedt, Chapel Hill, N.C.

[73] Assignee: Telefonaktienbolaget LM Ericsson, Stockholm, Sweden

[21] Appl. No.: 09/095,941

[22] Filed: Jun. 12, 1998

[30] Foreign Application Priority Data

Jun. 13, 1997 [SE] Sweden .................................. 9702271

[51] Int. Cl.[7] .......................... H04Q 7/20; H04B 7/005; H04B 7/00
[52] U.S. Cl. ......................... 455/447; 455/434; 455/503; 455/511; 370/329
[58] Field of Search ..................................... 455/434, 447, 455/515, 509, 511, 516, 450–455, 503, 502, 446; 370/337, 329, 349

[56] References Cited

U.S. PATENT DOCUMENTS

| | | | |
|---|---|---|---|
| 5,280,472 | 1/1994 | Gilhousen et al. | 370/335 |
| 5,381,443 | 1/1995 | Borth et al. | 370/329 |
| 5,390,366 | 2/1995 | Kasugai | 455/524 |
| 5,546,443 | 8/1996 | Raith . | |
| 5,583,870 | 12/1996 | Delprat et al. | 370/337 |
| 5,603,081 | 2/1997 | Raith et al. | 455/435 |
| 5,903,834 | 5/1999 | Wallstedt et al. | 455/503 |
| 5,963,869 | 10/1999 | Fehnel | 455/511 |

FOREIGN PATENT DOCUMENTS

| | | |
|---|---|---|
| 0486089A2 | 5/1992 | European Pat. Off. . |
| 0642283 | 3/1995 | European Pat. Off. . |
| 2252699 | 8/1992 | United Kingdom . |
| 2262203 | 6/1993 | United Kingdom . |
| 2306858 | 5/1997 | United Kingdom . |
| 9713386 | 4/1997 | WIPO . |

OTHER PUBLICATIONS

PCT International Search Report dated Apr. 14, 1998.
Fredric Kronestedt, "Radio Network Performance for Indoor Cellular Systems," Ericsson Radio Systems AB, Sep. 24, 1996.
Andre Aslundh et al., "A Performance Comparison of Three Indoor Radio Network Concepts Based on Time Dynamic Simulations," Submission to PIMRC'97.
S. Broddner et al., "Evolution of Cellular Technology for Indoor Coverage," Ericsson Radio Systems AB, ISSLS '96.
Per Beming et al., "Super Control Channel,," Ericsson, Invention Disclosure, 1996.
"Distributed Indoor Digital Multiple–Access Cellular Telephone System," US Patent Application No. 08/540,326.
Dupuy, P., "Based station operating system for Cellular radio . . . system," Abstract, Copyright, Derwent Information Limited, Feb. 1997.

*Primary Examiner*—Dwayne D. Bost
*Assistant Examiner*—Tracy M. Legre
*Attorney, Agent, or Firm*—Burns, Doane, Swecker & Mathis, L.L.P.

[57] ABSTRACT

The present invention relates to the reuse of a control channel in a distributed cellular radio communication system. At least one physical channel, the so called physical control channel, in the radio communication system is used for transferring logical control channels. According to the present invention the physical uplink control channel can be reused with respect to logical control channels comprising an access request. The physical downlink control channel can be reused with respect to logical control channels comprising a message that access is granted to a mobile station or a message that someone requests contact with a mobile station. According to the invention the physical uplink control channel and/or the physical downlink control channel is reused. This means that more connections per time unit may be established in the radio communication system.

33 Claims, 6 Drawing Sheets

REUSE OF A PHYSICAL CONTROL CHANNEL IN A DISTRIBUTED CELLULAR RADIO COMMUNICATION SYSTEM

TECHNICAL FIELD

The present invention relates to a method for the reuse of a physical control channel in a cell in a cellular distributed radio communication system. The invention also relates to a distributed cellular radio communication system in which the method is utilized. More specifically, the invention relates to the reuse of a physical control channel in a cell when the information being transmitted on the physical control channel does not need to have coverage in the whole cell.

DESCRIPTION OF RELATED ART

Cellular mobile radio communication systems normally comprise a number of mobile stations communicating with base stations through radio channels. A number of base stations are in turn controlled by a base station switching centre. Distributed cellular radio communication systems are systems comprising antennas or radio units distributed within a cell. The distributed antennas or radio units in a cell are controlled by at least one central unit which may in turn be controlled by a base station switching centre or a mobile switching centre.

A mobile station communicates with a base station over physical radio channels. A physical radio channel is defined in an FDMA system by a certain frequency, in a TDMA system by a certain frequency and a certain time slot and in a CDMA system by a certain code.

The information transmitted over the physical radio channels is separated into different logical channels depending on the type of information. The method of transferring the logical channels on the physical channels is called mapping. Several different types of information are to be transferred in a radio communication system, such as speech, control signalling and user data. Speech and user data are transmitted on logical traffic channels and control signals are transmitted on logical control channels. Logical control channels can comprise information that has to be transmitted to all mobile stations in a cell, for example, information about the cell. Other logical control channels only have to be transferred to a certain mobile station or to a certain base station; for example, a message that a certain mobile station is to establish a connection or the request from a mobile station to establish a connection.

In most conventional macrocellular radio communication systems most logical control channels in a cell are mapped onto one, or a number of, special physical channels. This implies that the logical control channels are always transmitted on the same physical channel or channels, hereinafter referred to as the physical control channel. The mobile stations then always know what physical channel they should listen to in order to receive a certain type of control information, and what physical channel they should transmit control information on. Other physical channels are used to transfer logical traffic channels.

When a mobile station desires contact with the network it transmits signals on a logical channel to request access. The logical channel is transferred on the physical control channel. If a mobile station is granted access an access message is transmitted on the downlink channel to this mobile station. If several mobile stations in a cell were to request permission to establish a connection a contention would occur. The mobile station transmitting the strongest signal would then be captured and granted permission to establish a connection, provided this signal is sufficiently strong. Other mobile stations would have to wait.

Cellular radio communication systems for indoor use are exposed to a special wave propagation environment. The propagation of the radio waves is obstructed, for example, by walls and doors and are put in the shade or reflected by other objects. To achieve a good coverage in indoor environments, several different radio communication systems have been proposed.

Such an indoor system is a so called pico cell system, which, like an ordinary macrocellular radio communication system, comprises a base station in each cell. The cells are, however, very small, and cover, for example, one floor of a building.

Another indoor system is a so called distributed antenna system in which a number of antennas are placed in a cell. The antennas are controlled by a base station unit. All antennas transmit the same information, so that the coverage within the cell increases. Physical channels cannot be reused within the cell, so the capacity is not higher than in a non-distributed antenna system.

Another type of distributed cellular radio communication system for indoor use is disclosed in the U.S. patent application Ser. No. 08/540326, in which each cell comprises a number of distributed radio units controlled by a central unit. A cell can cover, for example, a whole building. The interface between the radio units and the central unit can vary from the radio units comprising only parts of transceivers to the radio units comprising parts of the following signal processing.

Each cell is assigned one or more physical channels for the transfer of logical control channels. A particular control channel is always transmitted on the same physical channel, the physical control channel. On this physical channel, or channels, the same logical control channels are transmitted from all the antenna units in the cell. In this way the probability that all mobile stations can receive common information about, for example, the cell increases. Other physical channels may be used for logical traffic channels.

All radio units can preferably receive and transmit signals on all physical channels. Macro diversity may be obtained in the system in that a mobile station is simultaneously connected to at least two antenna units. The traffic channels may be reused within a cell, that is, more than one mobile station in a cell can transmit information on traffic channels on the same physical channel if the mobile stations do not disturb each other too much. The allocation of physical channels to the radio units is controlled by the central unit. To secure coverage in as large a part of the cell as possible the physical control channel is not reused.

Because traffic channels may be reused in a cell, the connection capacity in such a distributed system is high compared to the previously described indoor systems. However, only one mobile station within a cell can request access at any given time, and only one mobile station can establish a new connection at a given time. This is because only one access request may be received at a certain point in time and that the same information is transmitted from all radio units on the physical control channel or channels. Therefore, only one message of granted access can be transmitted at a given point in time.

SUMMARY OF THE INVENTION

The present invention attacks the problem of how to increase the capacity with respect to the number of connections that may be established simultaneously or shortly after each other in a distributed cellular radio communication system.

Another problem is how the occurrence of contention in a cell can be reduced.

An object of the present invention is therefore to increase the capacity in a distributed cellular radio communication system with respect to the number of connections established simultaneously or shortly after each other, that is, the number of connections established per time unit.

Another object is to reduce the occurrences of contention in a cell.

The problems are solved by reusing the physical channel used for transferring logical control channels when the logical channel to be transmitted on the physical control channel is of the type common control channel, either in the uplink or the downlink direction or in both the uplink and the downlink direction.

More specifically, the problems are solved in that each radio unit in the distributed cellular radio communication system receives signals on physical uplink channels. At least one physical channel is used, as is known, for example, in GSM systems, as a physical control channel, that is, logical control channels are mapped onto this physical channel. Signals on physical channels are received simultaneously by all radio units.

According to one embodiment of the invention signals are received on the physical control channel in the uplink direction simultaneously by all radio units. It is then determined what logical channel was transmitted on each physical channel. On the physical control channel in the uplink direction access channels comprising a request for access to the radio communication system are transferred. In a GSM system these channels are called RACH channels. Since signals on the physical control channel are received separately in each radio unit the received information in the access channels may differ for different radio units, that is, the physical uplink control channel may be reused in a distributed cell with respect to access channels.

The content of the access channels is interpreted. It is registered what mobile station requested access and what radio unit received the access request. In dependence of the interpretation it is determined what mobile stations are to be granted access and with what radio units they are to communicate. In dependence of the decision logical control channels are generated that are to be mapped onto the physical downlink control channel to each radio unit. Allocation channels, AGCH channels in GSM, are generated to the radio units that are to be allowed to connect to mobile stations.

The generated logical control channels are mapped, according to a predetermined map, onto the physical downlink control channel of the respective radio unit and are transmitted from the radio units to the mobile stations. It follows that different radio units can transmit different information on the physical downlink control channel, which may therefore be reused in the cell. A maximum of one connection per radio unit may be established, which increases the capacity with respect to the number of connections established per time unit.

According to other embodiments of the invention the physical control channel is reused only in the uplink direction, alternatively only in the downlink direction. In these cases, too, the capacity is increased with respect to the number of connections established per time unit. If the physical control channel is only reused in the uplink direction more accesses may be captured and it is therefore possible to establish more connections, albeit one at a time. If the physical control channel is only reused in the downlink direction mobile stations that have requested access at different points in time may be allowed to establish connections at the same time. Since the receive rate with respect to access channels is higher than the transmit rate regarding access channels, this increases the number of connections established per time unit.

An advantage of the present invention is that more connections may be established per time unit in a distributed cell, which leads to an increased capacity in a distributed cellular radio communication system.

Another advantage arises when the physical control channel is reused in the uplink direction, which reduces the number of contention occurrences.

The invention will be described in more detail in the following by means of preferred embodiments and with reference to the enclosed drawings.

DESCRIPTION OF PREFERRED EMBODIMENTS

Figure 1:
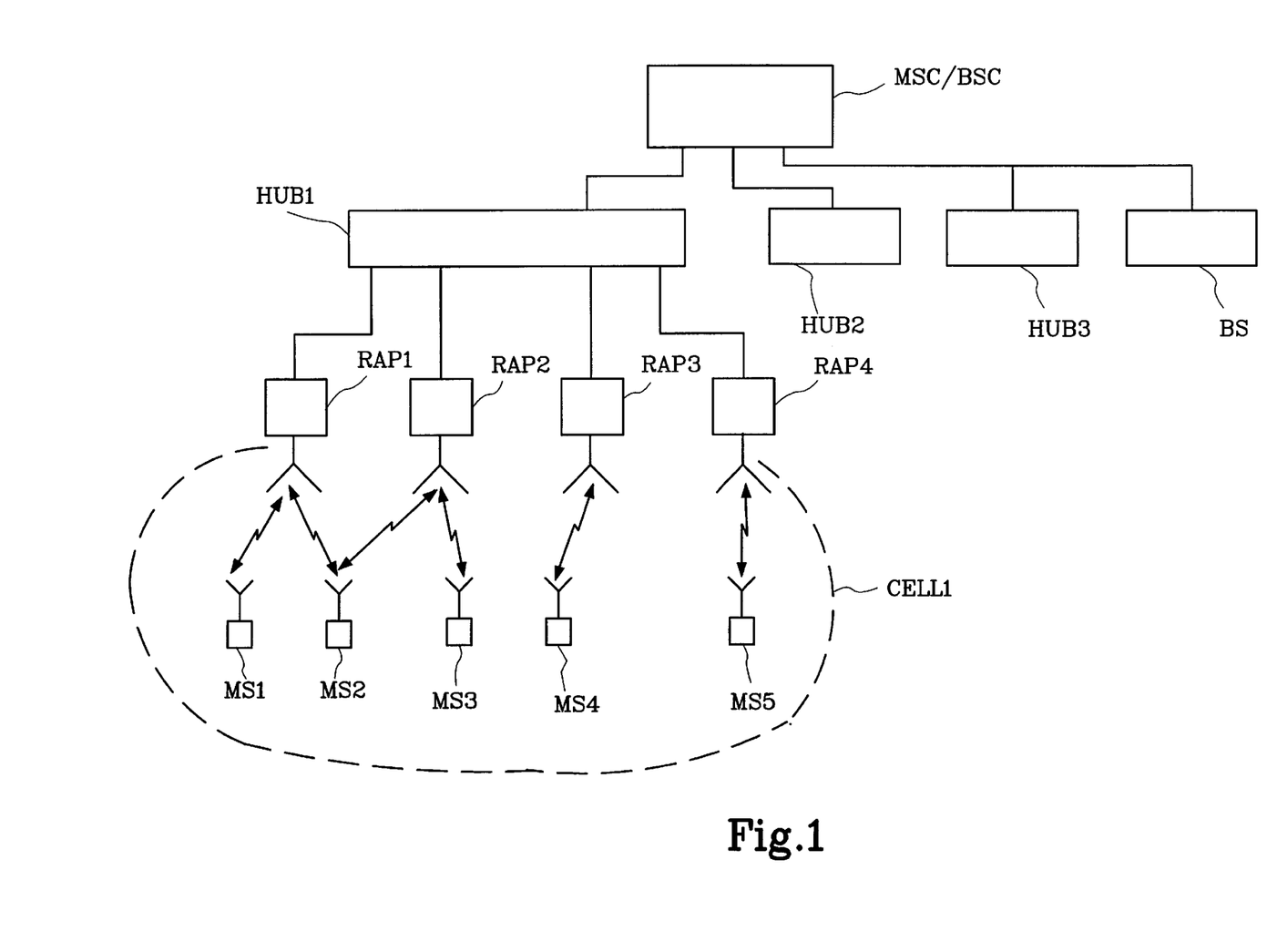
FIG. 1 shows, schematically, a distributed cellular radio communication system according to prior art.

FIG. 1 shows schematically a cellular radio communication system comprising distributed radio units according to prior art. The system comprises a mobile switching centre MSC, alternatively a base station switching centre BSC, controlling a number of central units HUB1–HUB3, and in the present case also a conventional base station BS. Each central unit HUB1–HUB3 in turn controls a number of distributed radio units RAP1–RAP3. It is also possible for a distributed cell to comprise more than one central unit. In the present system there are both cells comprising distributed radio units and cells comprising conventional base stations. The system illustrated in FIG. 1 thus comprises three distributed cells, only one CELL1 of which is shown in detail.

In a cell CELL1 a number of radio units RAP1–RAP4 are placed. Each radio unit comprises transmitter and receiver devices. The radio units RAP1–RAP4 in a cell are controlled by the central unit HUB1 in this cell. The radio units communicate with mobile stations MS1–MS5 through connections comprising physical uplink and downlink channels. An uplink and a downlink channel do not necessarily have to be connected to each other.

Each radio unit RAP1–RAP4 comprises receiving and transmitting units, for example, a broadband receiving unit and a broadband transmitting unit, so that they can receive and transmit signals on all physical uplink and downlink channels assigned to the cell. This means that no fixed channel allocation to the respective radio units has to be made. Another option is for each radio unit to comprise at least one receiver unit, each receiver unit being able to receive signals on one physical uplink channel and transmit signals on one physical downlink channel.

The central unit HUB1 in combination with the radio units RAP1–RAP4 in a cell may be seen as carrying out the functions performed by a base station, or a base station switching centre, in a conventional non-distributed cellular radio communication system. The interface between the radio units RAP1–RAP4 and the central unit HUB1 can vary, which means that the radio units may comprise different amounts of functionality.

In the embodiments of the invention described in the following it is assumed that the radio communication system in which the invention is implemented is designed according to that described above in connection with FIG. 1.

It is also assumed, for simplicity, that the system is a TDMA system, substantially according to the GSM standard. It will be understood that the invention can be implemented in other TDMA systems, in FDMA systems or in CDMA systems using similar types of logical channels, as well. As mentioned above, information is transferred as logical channels on physical channels. The logical channels can be logical control channels or logical traffic channels. In the following different logical control channels found in a general GSM system are described.

In a TDMA system according to the GSM standard the logical control channels may be divided into three groups: Broadcast Channels (BCH), Common Control Channels (CCCH) and Dedicated Control Channels (DCCH). Corresponding logical control channels are found in other TDMA systems, for example, in DAMPS systems.

The BCH channels transmit information in the downlink direction to all mobile stations in a cell. One of these channels is the BCCH channel comprising general information about the cell that has to be sent to all mobile stations in the cell. Other BCH channels are the Frequency Correction Channel (FCCH) and the Synchronization Channel (SCH).

The dedicated control channels are used both in the uplink and the downlink direction. The so called Stand Alone Dedicated Control Channel (SDCCH) is used in both uplink and downlink as a signalling channel, for example, for connection set-up. The so called Slow Associated Control Channel (SACCH) is used in the uplink direction to transfer measurement results from signal strength measurements carried out by mobile stations and in the downlink direction to transfer information about the power level with which the mobile station is to transmit.

BCH and DCCH channels will not be discussed further in connection with the invention.

The CCCH channels are used at access request and at channel allocation. In the GSM system there are two different CCCH channels in the downlink direction. The Paging Channel (PCH) is transmitted downlink to a certain mobile station with a paging message that the network wants to get in contact with the mobile station. The Access Grant Channel (AGCH) is transmitted downlink to a certain mobile station. This channel comprises an access message holding information about the channel that may be used as a signalling channel by the mobile station that is to establish a connection.

In the uplink direction, in a GSM system there is only one type of CCCH channel, the Random Access Channel (RACH). The RACH is transmitted uplink from a particular mobile station and comprises a request for a signalling channel. The RACH is used by the mobile station when it has received a PCH channel and been prompted to get in touch with the network and when the mobile station itself wishes to get in touch with the radio communication system.

Above the most common logical control channels in GSM have been described. There may be other logical control channels, which will not be described here.

The method used to transfer the logical channels onto physical channels is called mapping. The control channels are mapped according to a predetermined map. In a GSM system RACH channels are mapped onto the physical uplink channel defined by the time slot TS0 and the uplink carrier frequency $C_0$, usually according to a map 202 shown in FIG. 2a. The Figure shows a TDMA frame structure in which each TDMA frame 201 comprises eight time slots number 0 to 7, and the map 202 for the RACH indicated by R. The map is repeated cyclically. In the present case, an RACH channel may be mapped onto each time slot TS0.

Figure 2A:
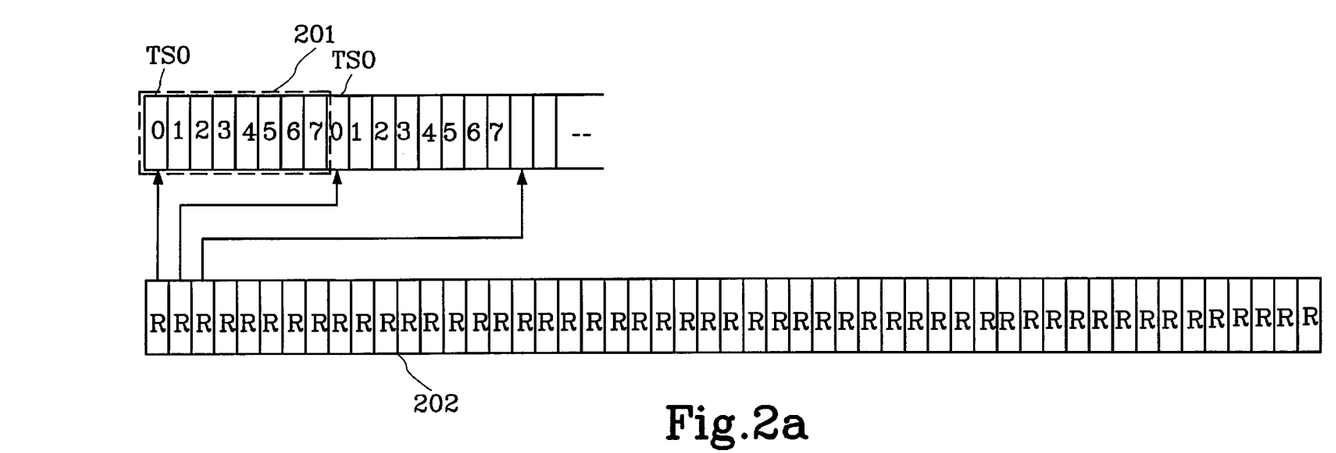
FIG. 2a is a map of the physical uplink control channel in a GSM system.
Figure 2B:
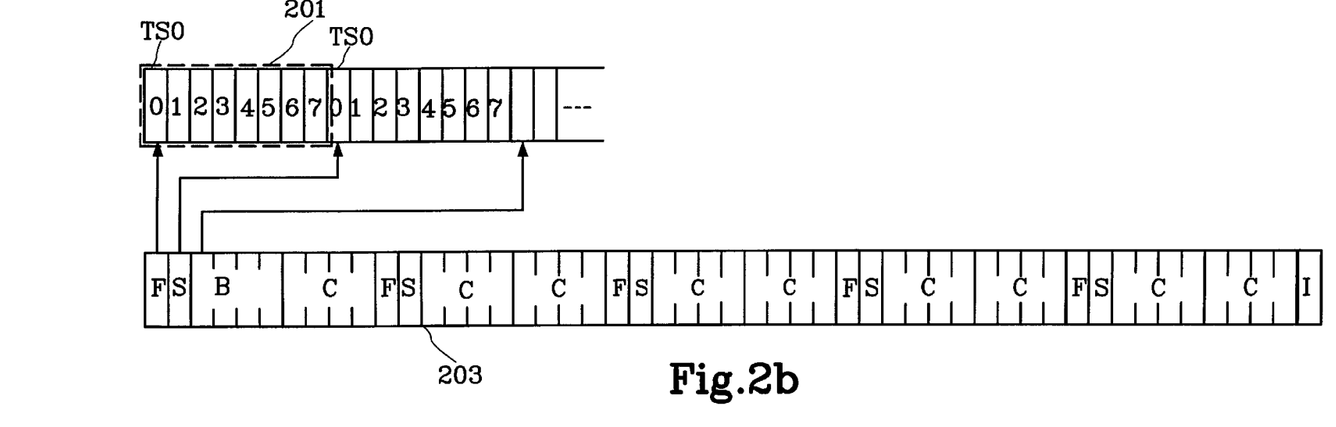
FIG. 2b is a map of the physical downlink control channel in a GSM system.

The BCH and the CCCH for the downlink direction are mapped onto the time slot TS0 and the downlink carrier frequency $c_0$ according to a predetermined map shown in FIG. 2b. In a TDMA system according to the GSM standard there are eight time slots for each TDMA frame. The time slots constituting a TDMA frame, and defined by the same carrier frequency, are called a frequency channel. The figure shows the frequency channel for the carrier frequency c0, in which each TDMA frame 201 comprises 8 time slots numbered from 0 to 7, and the map 203 for BCH channels and CCCH channels. FCCH is indicated by F, SCH is indicated by S, BCCH is indicated by B and CCCH is indicated by C. The CCCH channels may be of the type AGCH or PCH. At the end of the map an "empty" channel indicated by I is mapped, which means that a dummy burst is being transmitted.

The DCCH channels are usually mapped onto the time slot TS1 and to the carrier frequency $c_0$. Onto the other time slots of the BCCH carrier and on the other physical channels onto the rest of the available carrier frequencies, logical traffic channels are mapped. In cells having a low capacity traffic channels may also be mapped onto the BCCH carrier.

Figure 3:
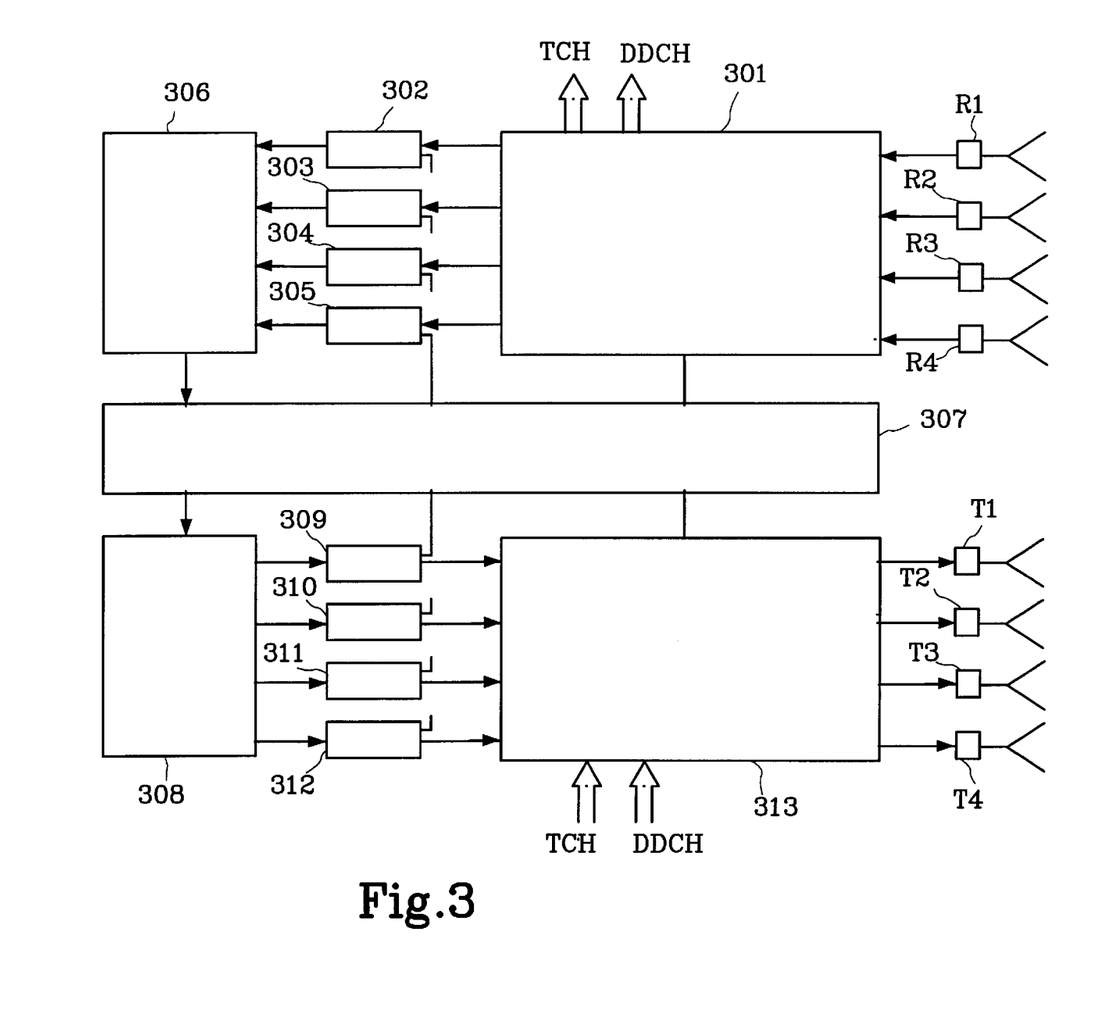
FIG. 3 is a schematic block diagram of parts of a distributed radio communication system according to the invention.

FIG. 3 shows a schematic block diagram of parts of a distributed radio communication system according to the invention. In the present case the system comprises four radio units shown divided into four receiving devices R1–R4 and four transmitting devices T1–T4. The distributed radio communication system can of course comprise a different number of radio units.

The receiving devices R1–R4 are, in the present example, assumed to comprise an antenna unit receiving broadband signals, low noise amplifiers, down conversion means for down conversion of the broadband signal to a broadband intermediate frequency signal, and A/D converters. The transmitting devices T1–T4 are, in the present example, assumed to comprise D/A converters generating a broadband analogue intermediate frequency signal, up conversion means converting the intermediate signal to a broadband RF signal, power amplifiers and an antenna unit transmitting the amplified broadband signal. A transmitting device and a receiving device, that is, a transceiver device, is usually comprised in a physical radio unit.

The receiving devices R1–R4 can, in the present example, receive broadband signals comprising signals simultaneously on all frequency channels in the radio communication system, said signals being transmitted from mobile stations. The respective receiving device R1–R4 the transfers the received broadband signals to a channel separating device 301. The channel separating device 301 first separates the received signals into physical channels, that is, in the present example, separates them into combinations of time slots and frequencies.

In the present inventive example there is a physical uplink control channel ch0 in the cell, on which the common control channel RACH is transferred in the uplink direction. On the corresponding downlink channel the two common control channels PCH and AGCH, and BCH channels, are transferred. Signals on this physical control channel are received simultaneously by all receiving devices. A supervision device 307 controls the channel separating device 301 and determines what physical channels are to be processed further for the respective receiving device. The information on the physical control channel is always processed for all receiving devices.

To achieve macro diversity in the system more than one receiving device can communicate with one mobile station, that is, more than one receiving device is then connected by the same connection to a certain mobile station. The receiving devices receiving information from the same mobile station then constitute one receiver group. The supervision device 307 in this case determines what receiving devices constitute a receiver group. The decision may be based, for example, on signal strength measurements or on experience.

The information received on the physical control channel by the respective receiving device R1–R4 or the receiver group in the present case, is demodulated separately. The information received on the other physical channels by the respective receiving device R–R4, or the receiver group in the present case, is demodulated separately. The type of logical channel is then identified. The result of the signal processing in the channel separating device 301 is thus parallel, separately demodulated bit streams regarding different types of logical channels for each physical channel and for each receiving device, or receiver group. The bit streams regarding the logical channels of the type traffic channels TCH and dedicated control channels DCCH are forwarded to channel decoding devices not shown in FIG. 3. This is indicated by the thick arrows. The further processing of traffic channels TCH and dedicated control channels DCCH will not be described in more detail in the following description.

The bit streams regarding logical RACH channels are fed to a respective RACH decoder device 302–305. The RACH decoder devices are controlled by the supervision device 307 which is indicated in FIG. 3. Each RACH decoder device decodes the respective RACH bit stream, that is, checks if any relevant information may be identified. Since RACH channels are transmitted from mobile stations without any previous indication it may be that at a certain time no RACH channel has been decoded from any receiving device, alternatively that an RACH channel has been decoded from one or more receiving devices. It may occur, for example, that no signal on an RACH channel has been received by a particular receiving device or that a particular receiving device has received RACH channels from several mobile stations, and that the signals have been of approximately equal strength, so that it has not been possible to decode any RACH channel separately.

The decoded RACH channels $RACH_1$–$RACH_4$ are transferred to a common interpretation device 306. For each decoded RACH channel the interpretation device 306 registers the mobile station that transmitted the RACH channel and the receiving device, or receiver group, that received the signal on the RACH channel. Several different receiving devices, or receiver groups, may have received signals regarding an RACH channel transmitted from a particular mobile station. The interpretation device 306 interprets this information in dependence of the received signal strengths on the received RACH channels. A mobile station can transfer an RACH channel that is received by more than one radio unit. The interpretation device may then interpret this, for example, as that he present RACH channel was received by the radio unit that received the strongest signal.

The interpretation results in information about the mobile stations that simultaneously requested permission to establish a connection, and the receiving device, or the receiver group, that received the respective access request.

The interpreted information is transmitted to the supervision device 307. The supervision device determines, on the basis of the interpreted information, what mobile stations are to be allowed to establish a connection and what receiving and transmitting device, or what receiver and transmitter group, the mobile station is to communicate with. Only one mobile station may be allowed to establish a connection to a particular receiving device and transmitting device, or receiver and transmitter group, at the same time.

The information about the mobile stations that are to be allowed to establish connections, and information about the receiving and transmitting devices, alternatively receiver and transmitter groups with which said mobile stations are to communicate, is transmitted to a generation device 308 for generation of reply messages. These reply messages are to be transmitted on common downlink control channels CCCH, on the physical downlink control channel from the transmitting devices. As mentioned above, there are two different CCCH channels in the downlink direction: the PCH and the AGCH.

As can be seen by the maps in the FIGS. 2a and 2b at the most one RACH channel can be received for each time slot TS0 on the uplink control channel. An AGCH channel can, on the other hand, not be transmitted in every time slot TS0 on the downlink, which means that it may happen that the device for generating reply messages generates more reply messages than can be transmitted when a CCCH channel is to be transmitted according to the map. In this case the reply messages are placed in a queue in which the reply messages generated first are first in the queue.

In the present example it is assumed that each transmitter device will be allowed by the supervising device to establish a connection. An AGCH channel comprising different information is therefore generated for each transmitting device, or each transmitter group, in the cell.

The respective generated reply message $AGCH_1$–$AGCH_4$ in the form of an AGCH channel for each transmitting device is then encoded in the respective encoding device 309–312. The encoding devices are controlled by the supervision device 307 as indicated in FIG. 3.

The encoded AGCH channels in the downlink direction and the other encoded logical downlink channels, that is, traffic channels TCH and dedicated control channels DCCH in the downlink direction, and BCH channels in the downlink direction are transferred to a channel generation device 313 for mapping of logical downlink channels onto physical downlink channels and for the further processing of bit streams to be transmitted on the logical channels. This device is controlled by the supervision device 307. The supervision device comprises a map for each physical uplink and downlink channel. The map for the physical downlink control channels is assumed, in the present example, to be the map shown in FIG. 2b.

The channel generation device 313 maps the respective encoded logical channels onto physical downlink channels in accordance with the map for the respective physical downlink channel.

When a CCCH channels is to be mapped onto the physical downlink control channel, in the present example, the generated AGCH channels $AGCH_1$–$AGCH_4$ will be mapped onto the physical downlink control channel of the different transmitting devices T1–T4.

In the channel generation device 313 the logical control channels and the other logical channels are then modulated separately. The modulated logical channels are then transmitted to the respective transmitting device T1–T4. If macro diversity is applied in the system, several transmitting devices, constituting a transmitter group, transmit the same logical channel on the same physical channel. The transmission may be time delayed to achieve time dispersion. The logical downlink channels are then transmitted on physical downlink channels from the transmitting devices to mobile stations.

If a transmitting device or transmitter group is not to transmit an access message to a mobile station, that is, if the associated receiving device has not received an access request in the form of an RACH channel, the encoding device 308, according to an inventive alternative embodiment, generates a dummy burst to this transmitting device.

According to another alternative embodiment the encoding device generates a copy of an already generated AGCH channel to this transmitting device.

According to yet another alternative inventive embodiment the encoding device 308, in the case when a transmitting device is not to transmit an AGCH channel, generates a PCH channel searching for a mobile station with which the radio communication system wishes to establish contact. According to this embodiment the supervision device 307 administrates the transfer of AGCH channels and PCH channels at the same time, which implies an increased complexity in the system. It is of course not certain that the mobile station searched for through the PCH channel is in the coverage area of the transmitting device or devices not transmitting an AGCH channel of their own. This embodiment, however, offers the possibility of establishing a connection faster, so that the system may become more efficient.

Since AGCH channels comprising different information may be transmitted from different transmitting devices in the cell several mobile stations may establish connections in the cell at the same time. The system can therefore utilize the radio units in a more efficient way.

Figure 4:
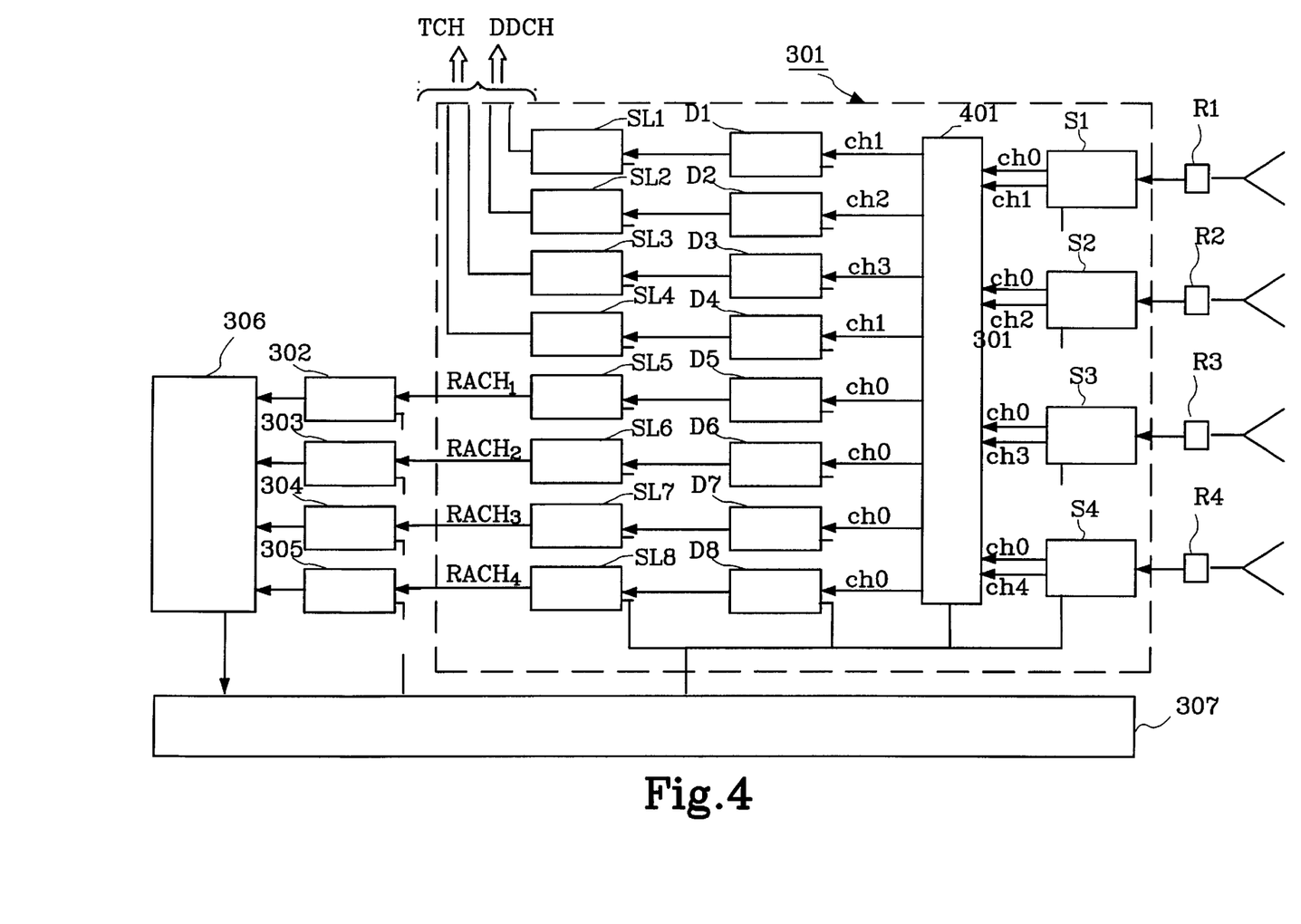
FIG. 4 is a schematic block diagram of an inventive embodiment of a channel separating device.

FIG. 4 shows, in a schematic block diagram, an inventive embodiment of the channel separating device 301. The devices described in connection with FIG. 3 keep their reference numerals in FIG. 4. The channel separating device 301 comprises separating devices S1–S4, a switching device 401, demodulation devices D1–D8 and logical channel separating devices SL1–SL8. All devices are controlled by the supervision device 307 as indicated in the figure. The received signals from each receiving device R1–R4 are transferred to a respective separating device S1–S4. The separating device separates each incoming broadband bit stream into a bit stream for each physical uplink channel ch0–ch3.

In the present example, for simplicity, it is assumed that each receiving device R1–R4 has received signals simultaneously on two physical channels. All receiving devices have simultaneously received signals on the physical control channel ch0 that may transmit RACH channels. A first receiving device R1 has also received a physical channel ch1 on an already established connection. A second receiving device R2 has also received a physical channel ch2 on an already established connection. A third receiving device R3 has also received a channel ch3 on an already established connection and a fourth receiving device has also received a channel ch1 on an already established connection. All connections transfer different information. The first R1 and the fourth R4 receiving device therefore reuse the physical channel ch1 for two different connections. A person skilled in the art will understand that each receiving device can receive signals on more than two physical channels.

The bit streams received for the connections on the physical uplink channels ch0–ch3 are then fed through a switching device 401 to a respective demodulation device D1–D8. There is a demodulation device for each established connection and a demodulation device for the physical uplink control channel for each receiving device.

In the present example it is assumed, for simplicity, that a physical connection is only connected to one receiving device, that is, macro diversity is not applied in the example. Each bit stream received on the physical control channel ch0 from the respective receiving device R1–R4 is demodulated separately in a demodulation device D1–D4 of its own. Each one of the bit streams on the channels ch1–ch3 from each receiving device R1–R4 is demodulated separately in a demodulation device D5–D8 of its own. A demodulated bit stream is obtained from each demodulation device D1–D8.

The respective demodulated bit stream is fed to a respective logical channel separating device SL1–SL8. The logical channel separating devices SL1–SL8 identify the type of logical channel received and the logical channels are forwarded to channel decoding devices in dependence of the type of logical channel. The demodulated bit streams transferred as RACH channels are thus fed to RACH decoding means 302–305, as described in more detail in connection with FIG. 3.

Figure 5:
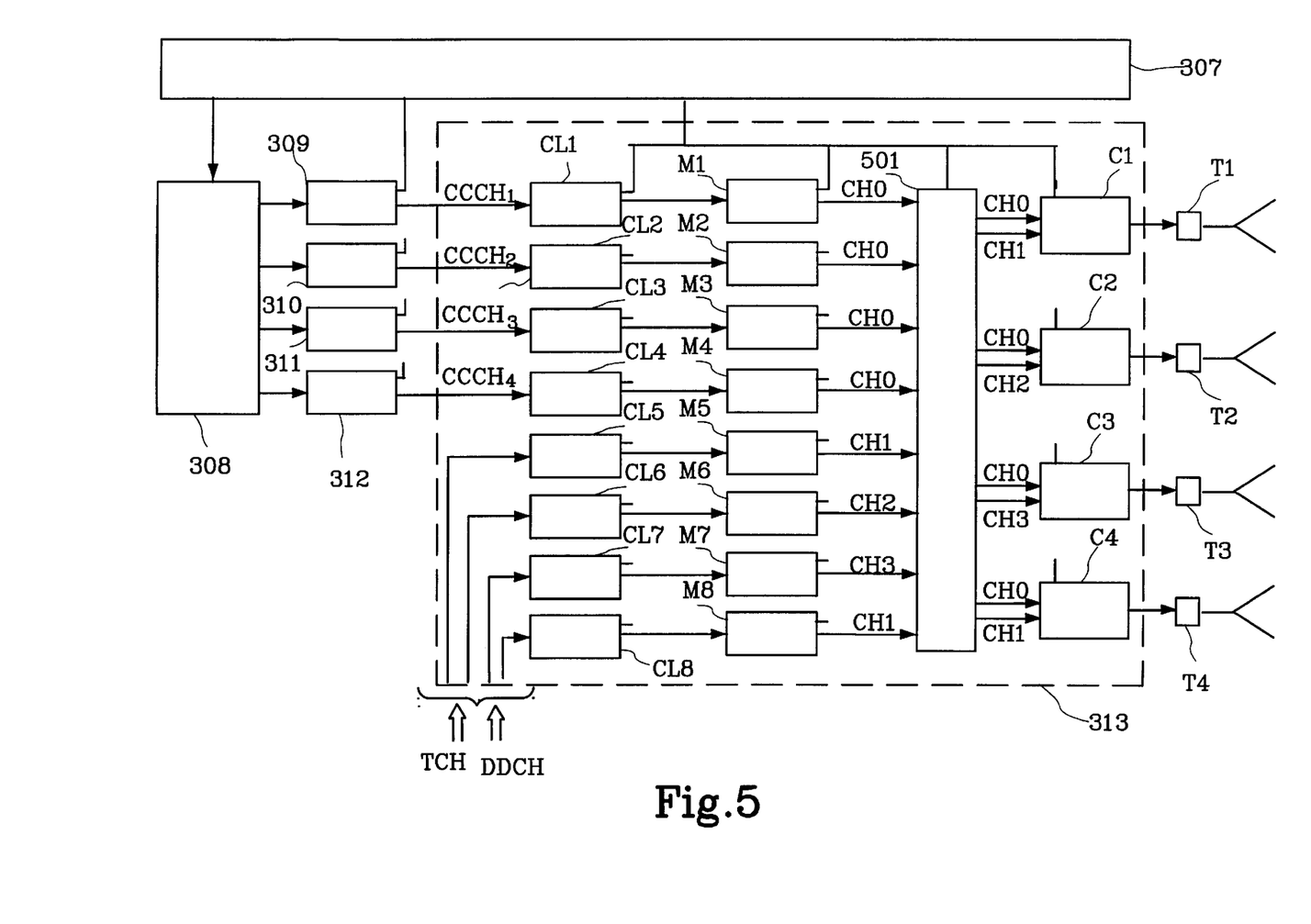
FIG. 5 is a schematic block diagram of an inventive embodiment of a channel generating device.

FIG. 5 shows a schematic block diagram of an inventive embodiment of said channel generating device 313. The channel generating device comprises channel generating devices CL1–CL8, modulation devices M1–M8, a switching device 501 and combining devices C1–C4. All devices are controlled by the supervising device 307, as indicated in FIG. 5. As described above the generating device 308 generates messages to be transmitted in CCCH channels in the downlink direction, that is AGCH and PCH, according to decisions made by the supervising device 307. Each one of these messages is encoded separately by an encoding device 309–312 of its own.

According to this example the generating means 308 has generated an AGCH channel $AGCH_1$–$AGCH_4$ for each transmitting device T1–T4, as described in more detail in connection with FIG. 3. Macro diversity is not applied in the example, that is, each transmitting device can transmit different information on the CCCH channels. The respective AGCH channel $AGCH_1$–$AGCH_4$ is fed to a respective mapping device CL1–CL4. Traffic channels TCH and DCCH channels encoded according to prior art are fed to a number of mapping devices CL5–CL8. In each mapping device CL1–CL8 the logical channel is mapped onto a physical channel. The AGCH channels $AGCH_1$–$AGCH_4$ are mapped onto the physical downlink control channel CH0 in accordance with the map shown in FIG. 2b. Thus, BCH channels are also mapped onto the physical downlink control channel CH0, but at different points in time. Traffic channels TCH and dedicated control channels DCCH are mapped onto other physical channels CH1–CH3.

From each mapping device CL1–CL8 each one of the physical channels CH0–CH3 is fed to a modulation device M1–M8 for modulation. Modulated bit streams are then fed from each modulating device M1–M8 through a switching device 501 to the respective combining device C1–C4. The supervising device 307 controls the switching so that the switching device 501 switches the logical channels, mapped onto physical channels, to the right transmitting devices. The combining devices C1–C4 combine the physical channels to be transmitted by the respective transmitting device T1–T4 to a broadband bit stream.

Each transmitting device T1–T4 then transmits the combined bit streams. In the present example AGCH channels $AGCH_1$–$AGCH_4$, comprising different messages from different transmitting devices, are transmitted on the physical control channel CH0. This means that a mobile station for each transmitting device obtains access at the same time.

As mentioned above in connection with FIG. 3, there are several alternative options in the case when there is not an AGCH channel for each transmitting device. A PCH channel, a dummy burst or a copy of an already generated AGCH channel may be generated in this case.

Hence, the physical control channel is reused both in the uplink and the downlink direction in the cell when CCCH channels are being transmitted. When BCH channels are being transmitted, of course, all transmitting devices will transmit the same information on the physical control channel. A first transmitting device T1, according to this example, also transmits traffic channels or DCCH channels on the physical channel CH1, a second transmitting device transmits on the physical channel CH2, a third transmitting device transmits on the physical channel CH3 and a fourth transmitting device T4 transmits on the physical channel CH1. The physical downlink channel CH1 is therefore reused in the cell with respect to traffic channels and DCCH channels.

In connection with FIGS. 4 and 5 an inventive embodiment has been described, in which a mobile station only communicates on one connection with a receiving and a transmitting device, or a radio unit. Macrodiversity is not used, to simplify the description. The transmitting device and the receiving device communicating with a certain mobile station do not have to be comprised in the same physical radio unit.

According to another embodiment macrodiversity is used in the system. This implies that the receiving devices and the transmitting devices in a cell are divided into receiver and transmitter groups. How the groups are put together may be determined, for example, adaptively and may therefore change with time. The supervising device 307 determines what transmitting devices T1–T4 and receiving devices R1–R4 constitute a group. The transmitting devices in a transmitting group then transmit the same information on the same physical channel. The receiving devices in a receiving group then receive the same information on the same physical channel. This means that a connection is established to at least two receiving and transmitting devices. This means that at the most one connection for each transmitting and receiving group may be established at one time.

In the FIGS. 3–5 the radio units have been shown divided into receiving and transmitting devices. Other devices shown in the FIGS. 3–5 may be comprised in the central unit. The interface between the central unit and the radio units do not, however, have to be as shown in the FIGS. 3–5. The separating devices S1–S4 and the combining devices C1–C4 may, for example, be comprised in the radio units.

According to yet another embodiment of the invention a radio unit comprises receiving devices and transmitting devices receiving signals on separate physical channel s. In this case each receiving device comprises low noise amplifiers and a receiving chain for each physical channel on which signals can be received. Each receiving chain comprises down converting units for converting a received signal to an intermediate frequency signal, a bandpass filter and an AID converter. Each transmitting device comprises a transmitting chain for each physical channel on which signals may be transmitted and a combining unit for combining the signals on the different physical channels before transmission. Each transmitting chain then comprise D/A converters and up converting units for converting IF signals to RF signals.

Figure 6:
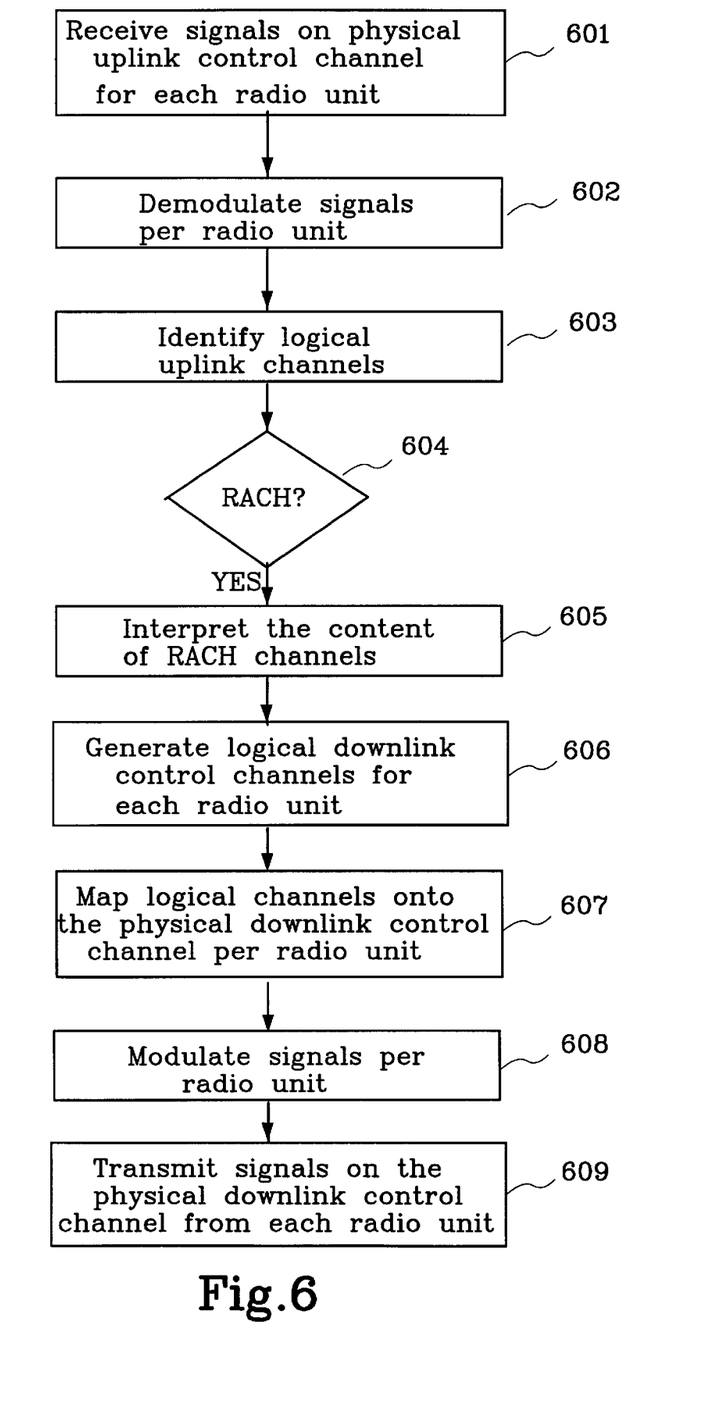
FIG. 6 is a flow chart of an embodiment of the method according to the invention.

In the following a general method according to the invention will be described. FIG. 6 shows a flow chart of an embodiment of the method according to the invention. In the present example both the physical uplink control channel and the physical downlink control channel are reused.

Each radio unit simultaneously receives 601 signals in the form of bit streams from mobile stations on the physical uplink control channel. Signals on other physical uplink channels are, of course, also received, but this is not discussed in the description of the method according to the invention. If a broadband signal has been received, it comprises signals transmitted on several different physical uplink channels. In this case the broadband bit stream is separated into a bit stream for each physical channel. The bit streams received on the physical uplink control channel for the respective radio unit are demodulated separately 602.

If macrodiversity is applied the same signal is received on the physical uplink control channel by at least two radio units. In the present case the bit streams transmitted from the same mobile station and received by different radio units are demodulated together.

The demodulated bit streams are then identified 603 with respect to the logical channel. The physical control channel in the present case only transfers RACH channels, but it is possible to transfer other logical channels as well on the physical uplink control channel. The bit streams relating to RACH channels (yes in 604) are decoded separately, in which case, for example, the bit stream from a particular radio unit cannot be decoded. The information in the decoded bit streams is interpreted 605 with respect to the radio unit that received the respective RACH channel and the mobile station that transmitted the respective RACH channel. It may also be the case that a bit stream transferred on an RACH channel cannot be decoded, which may be interpreted as that no information was received on this RACH channel. According to an embodiment of the invention the signal strength with which the respective antenna unit has received signals on RACH channels is also registered.

In dependence of the interpreted information logical control channels are generated 606, to be transmitted on the physical downlink control channel from the respective radio unit. In this example the logical control channels are CCCH channels, that is, either AGCH channels or PCH channels. According to the present embodiment, thus, a maximum of one mobile station per radio unit may be allowed to establish a connection to the radio unit, in which case AGCH channels comprising different information may be generated to each radio unit that is to establish a connection. Copies of already generated AGCH channels or PCH channels can be generated to the radio units that are not to establish a connection of their own, in accordance with that described above. If macrodiversity is applied a mobile station for each predetermined group of radio units may obtain an AGCH channel, as described above for transmitter and receiver groups.

The generated CCCH channels are mapped 607 simultaneously onto the physical control channel for each radio unit, or group of radio units. The mapping is made in accordance with a predetermined map, for example, the map shown in FIG. 2b. The bit stream of the physical downlink control channel for each radio unit, or group of radio units, is modulated 608 separately. The modulated bit streams are then transmitted on the physical downlink control channel from the respective radio unit, or group of radio units. If a broadband signal is to be transmitted, the signal is combined on the physical downlink control channel with channels to be transmitted on other physical downlink channels from the respective radio unit.

In an alternative embodiment of the invention only the physical downlink control channel is reused. This means that only information on one logical uplink channel for each physical uplink control channel in the cell can be received at each point in time. Only one RACH channel can then be received in the cell at any given time. In accordance with the maps mentioned and shown above more than one RACH channel may be received in a time period when no AGCH channel can be transmitted. A method corresponding to the one discussed in connection with FIG. 6 for the processing of transmitted logical uplink control channels may be carried out. It can then be determined, for each received RACH channel, that a mobile station is to be granted access to the radio communication system. Several different AGCH channels may then be generated and placed in a queue until it is time, according to the map, to map CCCH channels, that is, AGCH or PCH channels in the downlink direction. Several AGCH channels may then be transmitted simultaneously to different mobile stations from different transmitting devices. The capacity with respect to the number of connections established simultaneously is then increased compared to a system in which the physical control channel is neither reused in the uplink or in the downlink.

In yet another embodiment of the invention only the physical uplink control channel is reused. In this case signals transmitted on different logical uplink channels on the physical uplink control channel to different radio units in a cell may be received and decoded at the same time. This means that several RACH channels can be decoded simultaneously. However, only one AGCH channel at a time can be mapped and transmitted on the physical downlink control channel from the radio units in the cell at a given time. Generated AGCH channels are then placed in a queue and transmitted after each other according to the above mentioned map.

Since the physical uplink control channel is reused, the probability of capturing an RACH channel is greater than if only the information in one RACH channel has been decoded at a point in time. If only one RACH channel has been captured when actually information on several RACH channels has been transmitted from different mobile stations, it is not certain that the RACH channels that were not captured at a given point in time will be captured at a later point in time. The capacity with respect to the number of established connections per time unit will therefore increase considerably according to this embodiment.

In the embodiments of the invention described above the system has been assumed to be a GSM system, which usually transmits speech. There are also mobile radio communication systems that can transmit packet data. An example of such a system is the General Packet Radio Service (GPRS) system, which is intended to be introduced in GSM systems for the transfer of packet data. In such a system traffic channels and control channels corresponding to the ones mentioned above are found. Access requests are transmitted on a PRACH channel and access granted messages are transmitted on a PAGCH channel etc., the P denoting Packet. In a GPRS system all physical downlink channels, including the ones transmitting traffic channels, have a control signal, or flag, controlling the mobile station that is to be allowed to transfer information on the uplink. A channel may be said to be defined by its frequency, time slot and flag. Thus, a traffic channel as well may, in a certain sense, be seen as a control channel.

A logical traffic channel may be transferred on the same physical channel as a logical control channel in dependence of what the flag indicates.

There is no fixed map; instead the mapping is dynamic in dependence of the flag. If a PRACH channel is not transmitted at a given point in time to a certain radio head, data can therefore be transmitted to this radio head instead, in dependence of the state of the flag. When the method according to the present invention is applied in a GPRS system the flag may also be reused. Different flags can then be used for different radio heads.

Hence, according to the invention, the physical control channel or channels, in the present case, may be reused in the uplink and/or the downlink direction. In this way a higher number of access requests may be received at the same time, and/or more access can be granted at the same time. Therefore, the capacity with respect to the number of connections established for each time unit increases.

What is claimed is:

1. A method for the reuse of physical control channels in at least one cell in a distributed cellular radio communication system, said distributed cellular radio communication system comprising at least one mobile station and a number of radio units, wherein at least one cell comprises a number of radio units controlled by at least one central unit, said mobile stations communicating with said radio units through connections comprising physical uplink and downlink channels, wherein said physical uplink and downlink channels transfer logical uplink and downlink channels, respectively and wherein at least one physical uplink channel and at least one physical downlink channel in the cell are designated as the physical uplink control channel and the physical downlink control channel respectively, for transferring logical uplink and downlink control channels respectively, said method in each cell comprising the following steps:

a) simultaneously receiving signals on the physical uplink control channel for each radio unit, wherein said received signals can transfer different information;

b) identifying the type of logical uplink channels transmitted on said physical uplink control channel;

c) interpreting the information in the logical control channel of the type access channel, referred to as the logical access channel wherein said information comprises a request for contact with the radio communication system;

d) generating logical downlink control channels in dependence of said interpretation;

e) mapping the logical downlink control channels mentioned in step d) onto the physical downlink control channel for each radio unit;

f) simultaneously transmitting signals on the physical downlink control channel from each radio unit, whereby different information in the logical downlink control channels may be transmitted on the physical control channel from different radio units in the cell.

2. A method according to claim 1, further comprising separately demodulating received bit streams for the respective radio unit.

3. A method according to claim 1, further comprising separately modulating bit streams to be transmitted for the respective radio unit.

4. A method according to claim 1, wherein the receiving radio units are divided into groups of at least two radio units, said method further comprising separately demodulating received bit streams for the respective group of radio units.

5. A method according claim 1, wherein the radio units are divided into groups of at least two radio units, said method further comprising separately modulating bit streams to be transmitted for the respective group of radio units.

6. A method according to claim 1, wherein the received signals are broadband signals comprising signals on all physical uplink channels allowed in the cell.

7. A method according to claim 6, wherein the broadband signals are separated into physical channels.

8. A method according to claim 1, wherein the received signals are separated into physical channels.

9. A method according to claim 1, wherein said interpreting step further comprises registering the radio units that have received information on the logical access channel and determining from which mobile stations the respective logical access channel has been received.

10. A method according to claim 1, wherein said interpreting step further comprises registering and interpreting the signal strengths of the received signals on the respective logical access channels.

11. A method according to claim 1, wherein said radio communication system is a GSM system and wherein said logical access channels are RACH channels.

12. A method according to claim 1, wherein said radio communication system is a packet switched GSM system according to GPRS and wherein said logical access channels are PRACH channels.

13. A method according to claim 1, wherein said generating step further comprises the steps of:

determining the mobile stations that are to be given access to the radio communication system based on said interpretation; and generating allocation channels comprising a message to the effect that a mobile station is granted access to the radio communication system, to said mobile stations that are to be given access.

14. A method according to claim 13, wherein said radio communication system is a GSM system and wherein said allocation channels are AGCH channels.

15. A method according to claim 13, wherein said radio communication system is a packet switched GSM system according to GPRS and wherein said allocation channels are PAGCH channels.

16. A method according to claim 15, wherein said radio communication system is a GSM system and wherein said paging channels are PCH channels.

17. A method according to claim 15, wherein said radio communication system is a packet switched GSM system according to GPRS and wherein said paging channels are PPCH channels.

18. A method according to claim 13, wherein said generating step further comprises generating dummy bursts to the radio units that are not to transmit an access message.

19. A method according to claims 13, wherein said generating step further comprises generating copies of allocation channels already generated to the radio units that are not to transmit an allocation channel of their own.

20. A method according to claim 13, wherein said generating step further comprises generating paging channels comprising messages to the effect that the radio communication system requests contact with a certain mobile station, to the radio units that are not to transmit an access message of their own.

21. A method for the reuse of physical control channels in at least one cell in a distributed cellular radio communication system, said distributed cellular radio communication system comprising at least one mobile station and a number of radio units, wherein at least one cell comprises a number of radio units controlled by at least one central unit, said mobile stations communicating with said radio units through connections comprising physical uplink and downlink channels, wherein said physical uplink and downlink channels transfer logical uplink and downlink channels, respectively and wherein at least one physical uplink channel and at least one physical downlink channel in the cell are designated as the physical uplink control channel and the physical downlink control channel respectively, for transferring logical uplink and downlink control channels respectively, said method in each cell comprising the following steps:

a) simultaneously receiving signals on the physical uplink control channel for each radio unit, wherein said received signals can transfer different information;

b) identifying the type of logical uplink channels transmitted on said physical uplink control channel;

c) interpreting the information in the logical control channel of the type access channel, referred to as the logical access channel, wherein said information comprises a request for contact with the radio communication system;

d) generating logical downlink control channels of the type common control channels in dependence of said interpretation;

e) mapping one of the logical downlink control channels generated in step d) onto the physical downlink control channel for each radio unit;

f) transmitting signals on the physical downlink control channel from all radio units;

g) repeating steps e) and f).

22. A method according to claim 21, further comprising separately demodulating received bit streams for the respective radio unit.

23. A method according to claim 21, wherein the radio units are divided into groups of at least two radio units, said method further comprising separately demodulating received bit streams for the respective group of radio units.

24. A method for the reuse of physical control channels in at least one cell in a distributed cellular radio communication system, said distributed cellular radio communication system comprising at least one mobile station and a number of radio units, wherein at least one cell comprises a number of radio units controlled by at least one central unit, said mobile stations communicating with said radio units through connections comprising physical uplink and downlink channels, wherein said physical uplink and downlink channels transfer logical uplink and downlink channels, respectively, and wherein at least one physical uplink channel and at least one physical downlink channel in the cell are designated as the physical uplink control channel and the physical downlink control channel respectively, for transferring logical uplink and downlink control channels respectively, said method in each cell comprising the following steps:

a) receiving signals on the physical uplink control channel for all radio units at different points in time, wherein only one signal may be received at one point in time, which received signals can transfer different information;

b) identifying the type of logical uplink channels transmitted on said physical uplink control channel at each point in time;

c) interpreting the information in each logical uplink channel of the type access channel, referred to as the logical access channel, wherein said information comprises a request for contact with the radio communication system;

d) generating a logical downlink control channel for each radio unit in dependence of said interpretation;

e) mapping the logical downlink control channels mentioned in step d) onto the physical control channel for each radio unit;

f) simultaneously transmitting signals on the physical downlink control channel from each radio unit, wherein different information in the logical downlink control channels may be transmitted on the physical control channel from different radio units in the cell.

25. A method according to claim 24, further comprising separately modulating bit streams to be transmitted for the respective radio unit.

26. A method according to claim 24, wherein the transmitting radio units are divided into groups of at least two radio units, said method further comprising separately modulating bit streams to be transmitted for the respective group of radio units.

27. A distributed cellular radio communication system for reuse of physical control channels in at least one cell in a distributed cellular radio communication system, said distributed cellular radio communication system comprising:

least one mobile station and a number of radio units, wherein at least one cell comprises a number of radio units controlled by at least one central unit, said mobile stations communicating with said radio units through connections comprising physical uplink and downlink channels, wherein said physical uplink and downlink channels transfer logical uplink and downlink channels, respectively, and wherein at least one physical uplink channel and at least one physical downlink channel in the cell are designated as the physical uplink control channel and the physical downlink control channel respectively, for transferring logical uplink and downlink control channels respectively;

receiver means for receiving signals on physical uplink channels for each radio unit, wherein said received signals can transfer different information;

channel separating means for separating received bit streams on a physical uplink channel and a logical uplink channel and for identifying the logical uplink channel transferred on said physical uplink channel;

interpretation means for interpreting the information in the logical control channels of the type access channel, referred to as the logical access channels, wherein said information comprises a request for contact with the radio communication system;

decoding means for decoding the information transferred on said logical access channels;

generating means for generating logical downlink control channels in dependence of said interpretation;

channel generating means for mapping said logical downlink control channels onto the physical downlink control channel;

transmitting means for transmitting signals on the physical control channel from each radio unit, said signals being able to transfer different information; and     supervision means for controlling and supervising said means.

28. A distributed cellular radio communication system according to claim 27, wherein said receiver means are arranged to receive signals on the physical uplink control channel simultaneously from the respective radio unit.

29. A distributed cellular radio communication system according to claim 27, wherein said receiver means are arranged to receive only one signal on the physical uplink control channel at a particular point in time from the respective radio unit.

30. A distributed cellular radio communication system according to claim 27, wherein said transmitting means are arranged to be able to transmit different signals simultaneously on the physical downlink control channel from the respective radio unit.

31. A distributed cellular radio communication system according to claim 27, wherein said transmitting means are arranged to be able to transmit the same signal at a particular point in time on the physical downlink control channel from the respective radio unit.

32. A distributed cellular radio communication system according to claim 27, wherein the radio communication system is a GSM system.

33. A distributed cellular radio communication system according to claim 32, wherein the radio communication system is a packet switched GPRS system.

* * * * *